US009950700B2

United States Patent
Tong et al.

(10) Patent No.: US 9,950,700 B2
(45) Date of Patent: Apr. 24, 2018

(54) ROAD SURFACE CONDITION DETECTION WITH MULTI-SCALE FUSION

(71) Applicant: GM GLOBAL TECHNOLOGY OPERATIONS LLC, Detroit, MI (US)

(72) Inventors: Wei Tong, Troy, MI (US); Qingrong Zhao, Madison Heights, MI (US); Bakhtiar B. Litkouhi, Washington, MI (US); Shuqing Zeng, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 114 days.

(21) Appl. No.: 15/084,648

(22) Filed: Mar. 30, 2016

(65) Prior Publication Data
US 2017/0282869 A1    Oct. 5, 2017

(51) Int. Cl.
| | | |
|---|---|---|
| *B60T 8/17* | (2006.01) | |
| *B60Q 9/00* | (2006.01) | |
| *B60T 7/12* | (2006.01) | |
| *B60T 8/171* | (2006.01) | |
| *B60T 8/175* | (2006.01) | |

(52) U.S. Cl.
CPC ............ *B60T 8/171* (2013.01); *B60Q 9/00* (2013.01); *B60T 7/12* (2013.01); *B60T 8/175* (2013.01); *B60T 2210/10* (2013.01)

(58) Field of Classification Search
CPC . B60T 8/171; B60T 8/175; B60T 7/12; B60T 2210/10; B60Q 9/00
See application file for complete search history.

(56) References Cited

U.S. PATENT DOCUMENTS

| | | | | |
|---|---|---|---|---|
| 8,306,747 B1* | 11/2012 | Gagarin | ................... | G01C 7/04 701/408 |
| 2014/0195138 A1* | 7/2014 | Stelzig | ................. | G08G 1/0116 701/119 |
| 2014/0307247 A1* | 10/2014 | Zhu | ........................ | G01S 17/023 356/4.01 |

FOREIGN PATENT DOCUMENTS

WO    2013173911 A1    11/2013

OTHER PUBLICATIONS

Kazuya Takeuchi, et al., Distinction of Winter Road Surface Conditions Using Road Surveillance Camera, 2012 12th International Conference on ITS Telecommunications, 978-1-4673-1, © 2012 IEEE, pp. 663-667.

* cited by examiner

*Primary Examiner* — Rodney A Butler
(74) *Attorney, Agent, or Firm* — Quinn IP Law (57) ABSTRACT

A method of determining a surface condition of a path of travel. A plurality of images is captured of a surface of the path of travel by an image capture device. The image capture device captures images at varying scales. A feature extraction technique is applied by a feature extraction module to each of the scaled images. A fusion technique is applied, by the processor, to the extracted features for identifying the surface condition of the path of travel. A road surface condition signal provide to a control device. The control device applies the road surface condition signal to mitigate the wet road surface condition.

21 Claims, 5 Drawing Sheets

ROAD SURFACE CONDITION DETECTION WITH MULTI-SCALE FUSION

BACKGROUND OF INVENTION

An embodiment relates generally to detection of a wet road surface.

Precipitation on a driving surface causes several different issues for a vehicle. For example, water or snow on a road reduces the coefficient of friction between the tires of the vehicle and the surface of the road resulting in vehicle stability issues. Detection of water or snow on a road of travel is typically determined by a host vehicle sensing for precipitation on the road utilizing some sensing operation which occurs when the precipitation is already impacting the vehicle operation such as detecting wheel slip. As a result, the vehicle must monitor its own operating conditions (e.g., wheel slip) against dry pavement operating conditions for determining whether precipitation is present. As a result, such systems may wait for such a condition to occur or may introduce excitations to the vehicle for determining whether the condition is present (e.g., generating sudden acceleration to the driven wheels for invoking wheel slip if the precipitation is present).

In some applications where captured sensor data are used, e.g. images, the scale of the image analyzed may hinder the detection results. That is, conditions of a road surface may change as a vehicle travels along a road. For example, for a snow covered road, due to wind and other elements, the vehicle road may have patches of a snow covered surface and a dry covered surface. As a result, depending on the scale and when the image is captured, the respective road surface detection technique may actually not detect the snow covered surface.

SUMMARY OF INVENTION

An advantage of an embodiment is the detection of a snow covered surface by fusing different scaled sensor data. The technique described herein utilizes a plurality of varying scaled sensor data that provide localized scaling, global scaling, and scaling there between. Local scaled sensor data provide higher resolution to allow the system to confidently analyze confined sections of the road of travel. Global scaled sensor data, although in lower resolution, provide general conditions of a greater area of the path of travel since a larger surface area is analyzed. Various scaled sensor data are analyzed therebetween and the results are cooperatively fused to identify the condition of the road surface captured in the sensor data. The cooperative fusing of the scaled sensor data allow the system to utilize the advantages that each scaled data can provide in detecting snow on the surface of the path of travel. The techniques described herein utilize a feature-based level fusion technique, a decision-based level fusion technique, and a hybrid-based approach that cooperatively utilizes the feature-based level fusion approach and the decision-based level fusion approach.

An embodiment contemplates a method of determining a surface condition of a path of travel. Data of a surface of the path of travel is obtained by sensor-based devices. The sensor-based devices capture data at varying scales. A feature extraction technique is applied, by a feature extraction module, to each of the scaled data. A fusion technique is applied, by the processor, to the extracted features for identifying the surface condition of the path of travel. A road surface condition signal is provided to a control device. The control device applies the road surface condition signal to mitigate the wet road surface condition.

DETAILED DESCRIPTION

Figure 1:
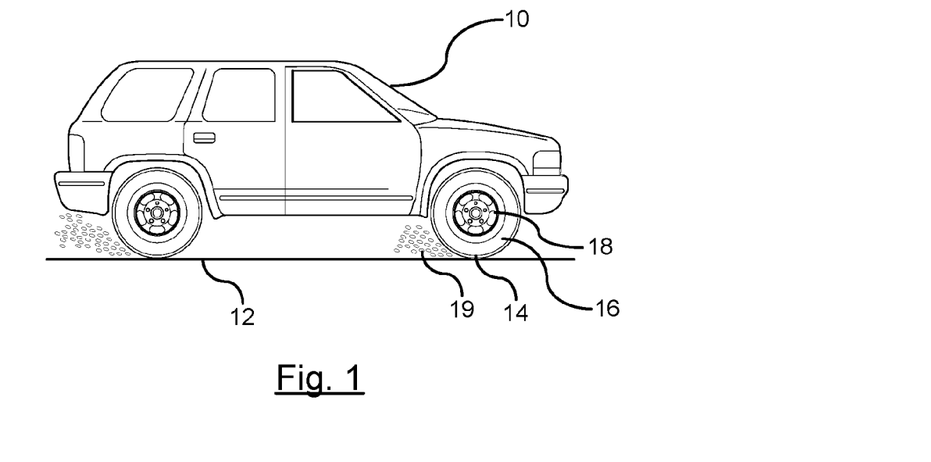
FIG. 1 illustrates a vehicle traveling along wet surface road.

There is shown in FIG. 1, a vehicle 10 traveling along a path of travel 12. Precipitation 19, in the form of snow or water, is shown disposed on the road of travel 12. It is advantageous to know when the vehicle will be traveling along snow covered path of travel 12 so that issues resulting from snow, such as loss of traction can be negated by providing this information to control devices for assisting the vehicle in determining an appropriate countermeasure for negating loss of traction and other negative effects that snow can have on the vehicle. It should be understood that although an automobile is used herein for exemplary purposes, the embodiments described herein can be applied to other types of systems aside from automobiles where detection of a snow surface condition is desired. Examples of vehicles that are other than automobiles that can utilize this system include, but are not limited to, rail systems, planes, off-road sport vehicles, robotic vehicles, motorcycles, bicycles, farm equipment, and construction equipment.

Precipitation 19 on the vehicle road 12 can result in a reduction of traction when driving on the snow covered surface. The precipitation 19 disposed on the vehicle road 12 lowers the coefficient of friction between the vehicle tires and the vehicle road 12. As a result, traction between the vehicle tires and the vehicle road 12 is lowered. Identifying precipitation on the road can further assist the vehicle in determining the appropriate mitigation technique for minimizing any loss of traction by various mitigation techniques that include, but are not limited to, warning the driver to lower the vehicle speed to one that is conducive to the environmental conditions; actuating automatic application of the vehicle brake using a very low braking force to minimize the precipitation formed on the braking surfaces of the braking components; deactivation or restricting the activation of cruise control functionality while precipitation is detected; or notification to the driver to maintain a greater stopping distance to a lead vehicle.

Figure 2:
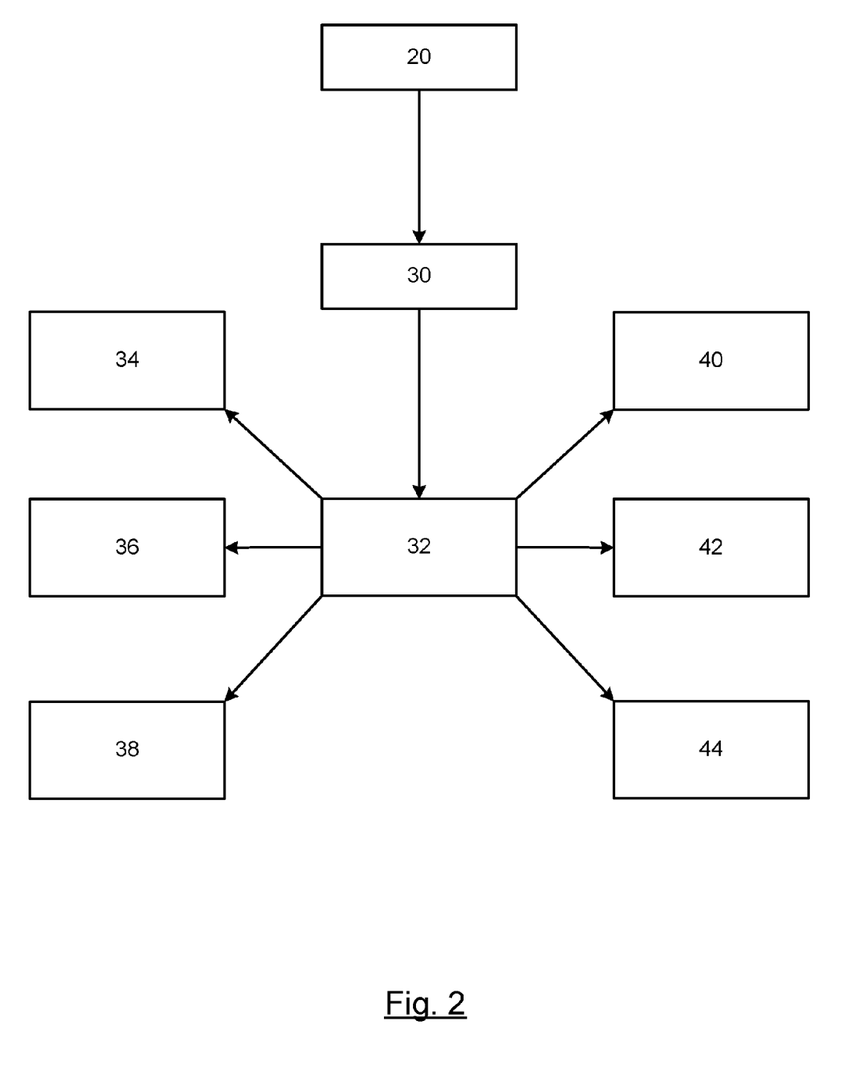
FIG. 2 illustrates a block diagram of a wet road surface detection system.
Figure 3:
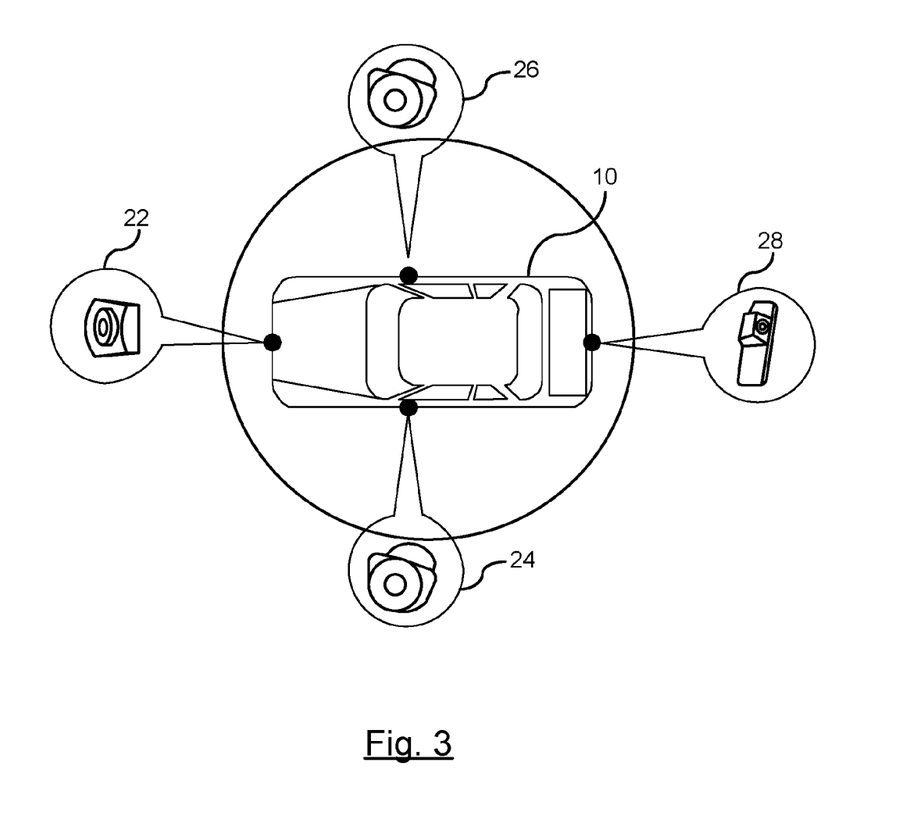
FIG. 3 illustrates an exemplary surround view imaging system for detecting objects around the vehicle.

FIG. 2 illustrates a block diagram of a road surface condition detection system. A plurality of sensor-based devices 20 are mounted on the vehicle for obtaining data relating to the road surface. Various types of sensor-based devices for obtaining data may include, but are not limited to, image-based devices (with/without active lighting sources), LIDAR, radar, infrared sensors, etc. For illustrative purposes described herein, vehicle-based image captured devices will be represented as the plurality of sensor-based devices 20. The plurality of vehicle-based image capture devices 20 are mounted on the vehicle for capturing images around the vehicle. The plurality of vehicle based image capture devices 20 may be mounted on the front, rear, and sides of the vehicle. FIG. 3 illustrates an exemplary 360 degree surround view coverage for detecting objects around the vehicle. Each of the image-based capture devices are cooperatively used to detect and identify objects on each side of the vehicle. The image-based capture devices 20 include, but are not limited to, a front view camera 22 is mounted to a front of the vehicle capturing image forward and partially to the sides of the vehicle. A driver's side camera 24 captures images on the driver side of the vehicle. A passenger's side camera 26 captures images on the passenger side of the vehicle. A rearward facing camera 28 captures images rearward and to the side of the vehicle.

Referring again to FIG. 2, a processor 30 processes the images captured by the image capture devices 20. The processor 30 analyzes images and data to determine whether precipitation is present on the road surface based on various precipitation detection techniques. Various techniques may include, but are not limited to, mirrored light image analysis technique, splash detection techniques, and tire track analysis technique.

The processor 30 may be part of an existing system, such as traction control system or other system, or can be a standalone processor dedicated to analyzing data from the image capture devices 22.

The processor 30 may be coupled to one or more output devices such as a controller 32 for initiating or actuating a control action if based on the analysis applied by the processor. One or more countermeasures may be actuated for mitigating the effect that the precipitation may have on the operation of the vehicle.

The controller 32 may be part of the vehicle subsystem or may be used to enable a vehicle subsystem for countering the effects of the precipitation. For example, in response to a determination that the road is snow covered, the controller 32 may enable an electrical or electro-hydraulic braking system 34 or similar where a braking strategy is readied in the event that traction loss occurs. In addition to preparing a braking strategy, the braking system may autonomously apply a light braking force, without awareness to the driver, to remove precipitation from the vehicle brakes once the vehicle enters the precipitation. Removal of precipitation build-up from the wheels and brakes maintains an expected coefficient of friction between the vehicle brake actuators and the braking surface of the wheels when braking by the driver is manually applied.

The controller 32 may control a traction control system 36 which distributes power individually to each respective wheel for reducing wheel slip by a respective wheel when a respective amount of precipitation is detected on the road surface such as in the case of hydroplaning.

The controller 32 may control a cruise control system 38 which can deactivate cruise control or restrict the activation of cruise control when precipitation is detected on the road surface.

The controller 32 may control a driver information system 40 for providing warnings to the driver of the vehicle concerning precipitation that is detected on the vehicle road. Such a warning actuated by the controller 32 may alert the driver to the approaching precipitation on the road surface and may recommend that the driver lower the vehicle speed to a speed that is conducive to the current environmental conditions, or the controller 32 may actuate a warning to maintain a safe driving distance to the vehicle forward of the driven vehicle. It should be understood that the controller 32, as described herein, may include one or more controllers that control an individual function or may control a combination of functions.

The controller 32 may further control the actuation of automatically opening and closing air baffles 42 for preventing water ingestion into an engine of the vehicle as a result of melted snow. Under such conditions, the controller 32 automatically actuates the closing of the air baffles 42 when water is detected to be present on the road surface in front of the vehicle and may re-open the air baffles when water is determined to no longer be present on the road surface.

The controller 32 may further control the actuation of a wireless communication device 44 for autonomously communicating the wet pavement condition to other vehicles utilizing a vehicle-to-vehicle or vehicle-to-infrastructure communication system.

The controller may further provide the wet road surface signal alerts to a driver of the vehicle against a use of automated features that include, but are not limited to, Adaptive Cruise Control, Lane Following, Lane Change, Evasive/Assist Steering Maneuver, Automated Emergency Braking, etc.

As described earlier, a snow road surface detection technique is executed for determining whether the road surface has snow disposed on the surface. Various factors can affect whether a successful detection of precipitation on the road surface. One factor that can affect a successful detection of the road surface condition includes the scale of the image. That is, different scaled image might indicate different road surface conditions since the road surface may not have a uniform condition (e.g., uniform weather pattern). For example, an image that captures a local sized scale of the road surface may have high classification accuracy as only a confined portion of the road surface resulting in a high resolution is analyzed allowing the system to confidently analyze that confined portion of the road. However, patches of both dry and snow covered road surfaces may exist on the path of travel, and if the image only captures a dry portion, then the detection results may be incorrect since the lack of information as to other portions of the path of travel containing snow patches are not analyzed. In regards to large/global scale captured images of a road, more information is captured and analyzed with respect to the general condition of the path of travel since a larger surface area is analyzed. While a larger surface area may be analyzed, the classification accuracy and confidence are lower than that of the local scale. As a result, various image scales ranging in between a large image scale and a local image scale will have both advantages and disadvantages within respect to one another. The system as described herein utilizes a plurality of different sized scales and the results are cooperatively fused to identify the condition of the road surface captured in the images.

Figure 4:
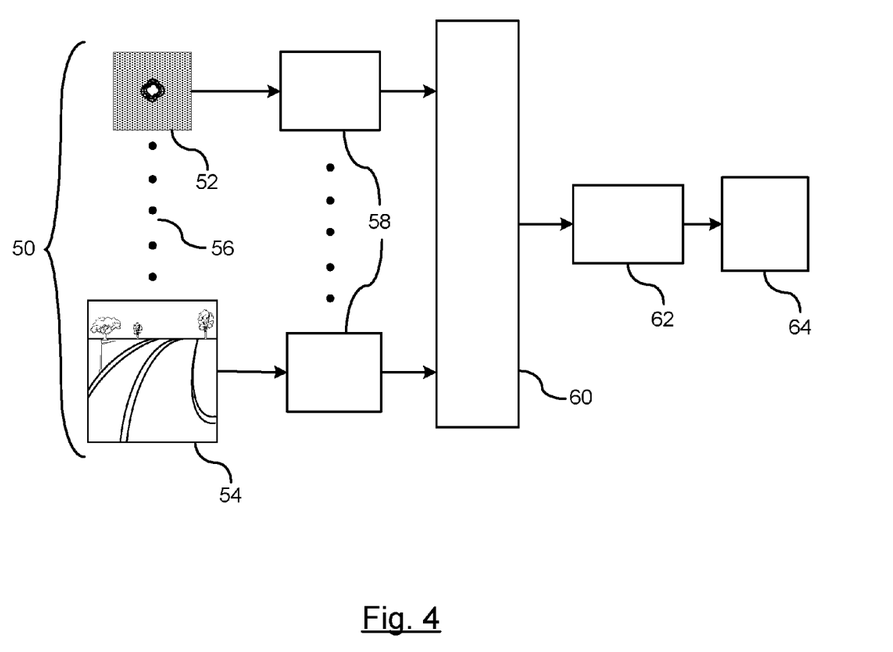
FIG. 4 illustrates a flow diagram of a first technique of fusing results based on a feature level fusion technique.

FIG. 4 illustrates a flow diagram of a first technique of fusing results based on a feature fusion level technique for identifying a condition of a road surface at a feature level. A plurality of images 50 are each captured at different scales where varying degrees of area coverage of the road surface are captured. An exemplary local scale is shown generally at 52 where a close up image is captured of the road. In the exemplary local scale image 52, a very confined section of the road surface encompasses the entire image (e.g. 2×2 inches section of the road). The more localized the image, the greater resolution that the image will provide which assists with increased classification accuracy and confidence. However, the more localized the image, less details that are provided regarding the surface condition of the road surface outside of the confined section which results in a lack of information about the general condition of the road surface outside of the confined region.

An exemplary global scale image is shown generally at 54 where a long stretch of the road of a travel is captured in the image (e.g., 300 ft). The global scale provides greater details of the condition of the road surface based on whether the condition of the road surface is uniform or whether the condition is sporadic. While the global scale image 54 provides enhanced insight as to the uniformity of the condition along a significant distance of the road, less resolution is present in the global scale image 54. Less resolution results in decreased classification accuracy and confidence.

A plurality of intermediate scale images ranging therebetween the local scale image 52 and the global scale image 54 is represented generally by 56 are captured and used for analysis. Varying degrees of scale images will provide a compromise between image resolution and surface uniformity information. As a result, each of the scales can be cooperatively analyzed for determining the condition of the road with increased classification accuracy and confidence as well as uniformity of the surface condition over a significant distance of the road.

For each captured scaled image, feature extraction technique is applied by a feature extraction module 58 to extract features in each captured scaled image. Feature extraction starts from an initial set of measured data, e.g., the raw pixel value from the images, and builds derived values (features) intended to be informative and non-redundant, facilitating the subsequent classification in module 62. Most often how to derive features is defined specifically by human who understand the problem very well. For example some commonly used handcrafted features $v_i$ of a captured image $I_i$ are edges, Histogram of Oriented Gradients (HOG), Scale-Invariant Feature Transform (SIFT), etc. Besides those handcrafted features, there is another type of technology which is able to discover features automatically from the data without human intervention or assistance. Deep learning is a method which models high-level abstractions in data by using multiple processing layers with complex structures or multiple non-linear transformations. It has been shown in some applications that the features discovered by deep learning technology have better performance than those handcrafted features.

After features are extracted from each respective scaled image, each of the extracted features are input to a feature level fusion module 60 where feature fusion is applied to each of the extracted features. The feature level fusion module may be part of the processor or another processor. Preferably, the extracted features are each represented as a vector $v_i$ that includes representation factors (e.g., a number or a set of numbers) generated by the deep learning technique or similar. The feature level fusion module 60 fuses the extracted features to form a fused vector feature v as:

$$v = f(v_1, v_2, \ldots, v_k)$$

where the function $f(x)$ takes the features vectors at different scales as the inputs and then fuse them together to generate the fused feature vector v. A simple example of the function $f(x)$ is to simply concatenate feature vectors of each scale as $$v = (v_1^T, v_2^T, \ldots, v_k^T)^T.$$

After fusing the feature vectors, e.g., concatenating the feature vectors, the fused vectors v are input to a classifier 62. The classifier 62 classifies the condition of the road surface as a function of the fused vector.

The determined condition of the road is output to output device 64. The output device 64 may include a visual alert/warning that is used to alert the driver of the snow road surface condition. The output device 64 may further include one of the controllers as described earlier that uses the information of the road surface condition to enable countermeasures for mitigating loss of traction resulting the road surface condition. The output device 64 may further include a communication device that communicates with a remote vehicle, fixed entities, or other respective entities to provide notification to others of the wet road surface.

Figure 5:
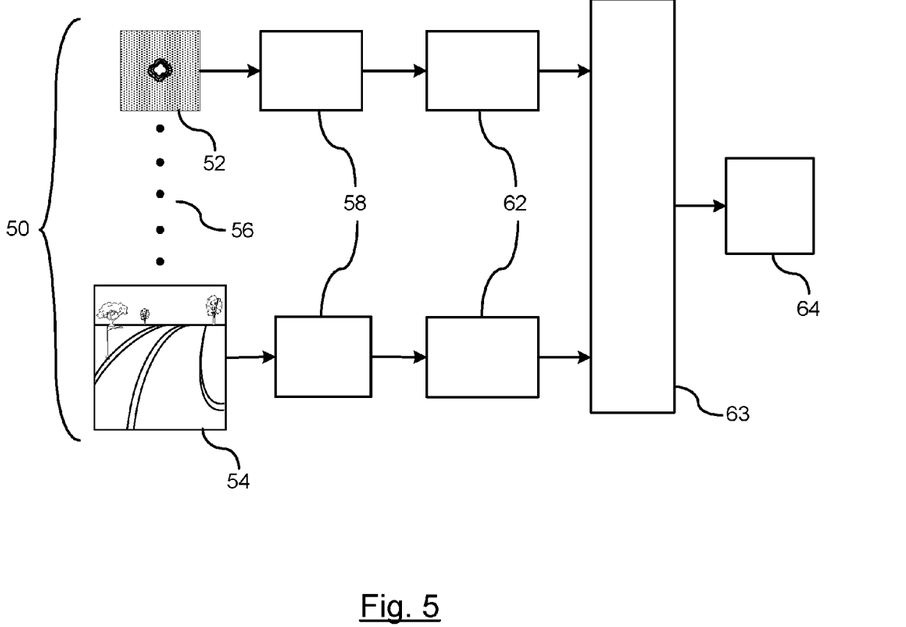
FIG. 5 illustrates a flow diagram of a second technique of fusing results based on a decision level fusion technique.

FIG. 5 illustrates a flow diagram of a second technique of fusing results based on a decision level for identifying a condition of a road surface at a decision level. The plurality of images 50 are captured each at different scales where varying degrees of area coverage of the road surface are captured. The feature extraction module 58 applies deep learning feature extraction techniques to the images of the captured at the local scale 52, global scale 54, and intermediate scales 56 for feature extraction.

In response to extracting features from each scaled image, the extracted features are independently input to the classifier 62 for identifying the road surface condition for each scaled image. That is, a road surface condition $C_i$ is classified using each extracted feature $v_i$.

After each respective extracted feature is independently classified by the classifier 62, each of the classified conditions is input to a decision level fusion module 63 for fusing the each of the classified results. The decision level fusion module may be part of the processor or another processor. A final road surface condition C is determined by fusing each of the determined road surface conditions $C_i$. For example, the final road surface condition C may be determined using the following formula:

$$C = \Sigma_{i=1,\ldots,k} w_i C_i$$

where $w_i$ is the weight determined by the classification confidence of each $C_i$ or can be based on prior knowledge. Prior knowledge can be any prior testing or prior experience that provides greater insight as to what a confidence level would be associated with a respective scale based on the present conditions.

In response to the determination of the final road surface condition C, the results are output to the output device 64 which can include a visual alert/warning for alerting the driver, controllers for mitigating the road surface conditions, or communication device for alerting other entities of the snow road surface condition.

Figure 6:
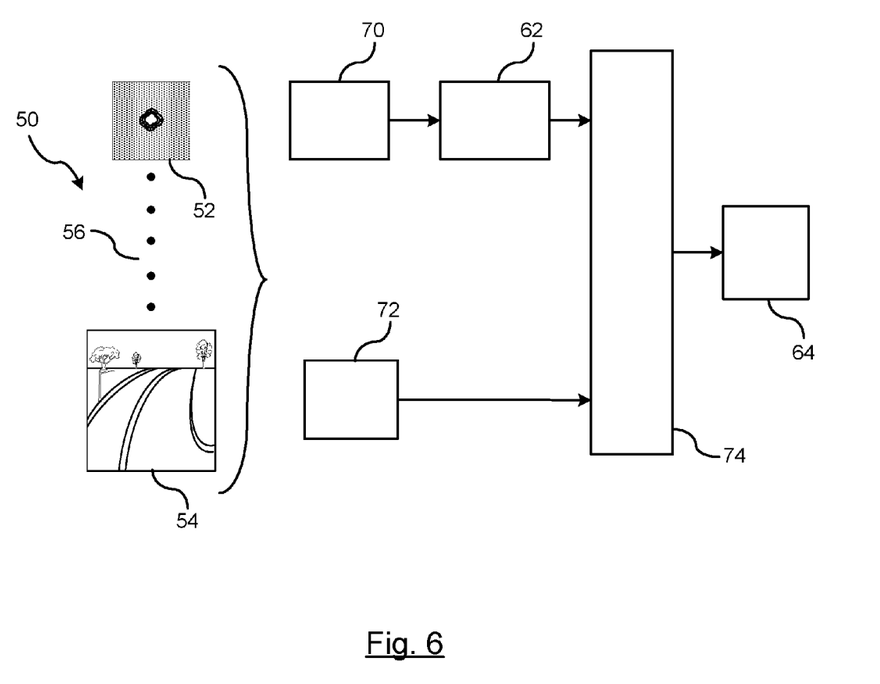
FIG. 6 illustrates a flow diagram of a third technique of fusing results for identifying a condition of a road surface at a decision level using a hybrid technique.

FIG. 6 illustrates a flow diagram of a third technique of fusing results for identifying a condition of a road surface at a decision level using a hybrid technique. As described earlier, the plurality of images 50 are captured each at different scales where varying degrees of area coverage of the road surface are captured. The deep learning feature extraction technique is applied to the images captured at the local scale 52, global scale 54, and intermediate scales 56 for feature extraction.

Each of the fusion techniques described in FIG. 4 (i.e., feature level fusion) and in FIG. 5 (i.e., decision level fusion) are applied to the extracted features for generating two independent fused results. The feature level fused results are represented generally by 70. The decision level fused results are represented by generally by 72.

The feature level fusion results 70 are input to the classifier 62 for classifying the feature fusion results and generating the resulting road surface condition.

The decision level fusion results 72 are already classified so additional classification is not required by the decision level fusion results 72.

The feature level fusion results 70 classified by the classifier 62 and the decision level fusion results 72 are input to a hybrid fusion module 74 where these respective results are fused together for generating a fused classification $C_h$. For example, the fused classification $C_h$ may be determined utilizing the following formula:

$$C_h = w_f C_f + w_d C$$

where $C_f$ is the feature level fusion result, $w_f$ is a classification confidence of $C_f$ or can be based on prior knowledge, $C_d$ is decision level fusion result, and $w_d$ is a classification confidence of $C_d$ or can be based on prior knowledge.

In response to the determination of the final road surface condition $C_h$, the results are output to the output device 64 which can include a visual alert/warning for alerting the driver, controllers for mitigating the road surface conditions, and/or a communication device for alerting other entities of the snow road surface condition.

While certain embodiments of the present invention have been described in detail, those familiar with the art to which this invention relates will recognize various alternative designs, filtering process and embodiments for practicing the invention as defined by the following claims.

What is claimed is:

1. A method of determining a surface condition of a path of travel comprising the steps of:
   obtaining data of a surface of the path of travel by sensor-based devices, the sensor-based devices capturing data at different sized scales;
   applying a feature extraction technique, by a feature extraction module, to each of the scaled data;
   wherein each feature extracted by the feature extraction module is independently input to a classifier, wherein the classifier outputs a respective classified result for each extracted feature input to the processor;
   wherein the classifier provides the classified results for each extracted feature to a decision level fusion module of the processor, the decision level fusion module determining the surface condition of the path of travel based on fused classified results;
   wherein the fused classified results are determined based on the following formula:

$$C = \Sigma_{i=1, \ldots, k} w_i C_i$$

wherein $C_i$ is the classified result of each extracted feature by the classifier, and $w_i$ is a weighting function;
   applying a fusion technique, by the processor, to the extracted features for identifying the surface condition of the path of travel; and
   providing a road surface condition signal to a control device, the control device applying the road surface condition signal to mitigate the wet road surface condition.

2. The method of claim 1 wherein each of the extracted features from each scale data are concatenated in a feature level fusion module of the processor.

3. The method of claim 2 wherein an output from the feature level fusion module is input to a classifier for identifying the surface condition of the road.

4. The method of claim 1 wherein the weighting function is determined by a classification confidence of the classified result.

5. The method of claim 4 wherein the weighting function is determined by prior knowledge of a scaling size of the captured image.

6. The method of claim 1 wherein each of the extracted features are input to a feature level fusion module of the processor to generate a feature level fusion result and a decision level fusion module of the processor to generate a decision level fusion result.

7. The method of claim 6 wherein the feature level fusion result is determined as a function of extracting features from each respective scaled data, wherein each extracted feature is input to the feature level fusion module for generating the feature level fusion result.

8. The method of claim 7 wherein the feature level fusion result is input to a classifier for identifying the surface condition of the road as a function of the extracted features.

9. The method of claim 8 wherein the decision level fusion result is determined as a function of extracting features from each respective scaled data by the decision level fusion module, wherein each feature extracted by the feature extraction module is independently input to the classifier, wherein the classifier outputs a respective classified result for each extracted feature, and wherein the classifier provides the classified results to the decision level fusion module for generating a road surface condition based on decision level fusion result.

10. The method of claim 9 wherein the classified feature level fusion result and the decision level fusion result are input to a hybrid fusion module of the processor to generate a hybrid fusion result identifying the surface condition of the path of travel.

11. The method of claim 10 wherein fusion module determines the hybrid fusion result based on the following formula:

$$C_h = w_f C_f + w_d C_d$$

where $C_f$ is the feature level fusion result, $w_f$ is a classification confidence weight, Ca is decision level fusion result, and $w_d$ is a classification confidence result.

12. The method of claim 1 wherein fusion results are determined as a function of extracting features from each respective scaled data, wherein each feature extracted by the feature extraction module for determining the fusion results is independently determined using a deep learning technique.

13. The method of claim 1 wherein the road surface condition signal is provided to a vehicle controller, the controller using the road surface condition signal to determine an autonomous actuating vehicle braking strategy.

14. The method of claim 1 wherein the road surface condition signal is provided to a vehicle controller, the controller using the road surface condition signal to determine a traction control strategy for autonomously actuating a traction control system.

15. The method of claim 1 wherein the identified road surface condition signal is provided to a wireless communication system for alerting other vehicles of the identified surface condition on the path of travel.

16. The method of claim 1 wherein the road surface condition signal alerts a driver of a potential reduced traction between vehicle tires and the road surface.

17. The method of claim 1 wherein the identified road surface condition signal alerts a driver of the vehicle against a use of automated features.

18. The method of claim 1 wherein the identified road surface condition signal is provided to a vehicle controller, the controller autonomously modifying a control setting of an automated control feature in response to the road surface condition signal.

19. The method of claim 1 wherein the identified road surface condition signal is provided to a vehicle controller, the controller autonomously disabling cruise control in response to the road surface condition signal.

20. The method of claim 1 wherein the identified road surface condition signal alerts a driver to reduce a vehicle speed.

21. The method of claim 1 the data is obtained by active capture devices.

* * * * *

UNITED STATES PATENT AND TRADEMARK OFFICE
CERTIFICATE OF CORRECTION

PATENT NO. : 9,950,700 B2  
APPLICATION NO. : 15/084648  
DATED : April 24, 2018  
INVENTOR(S) : Tong et al.

Page 1 of 1

It is certified that error appears in the above-identified patent and that said Letters Patent is hereby corrected as shown below:

In the Claims

In Column 8 Line 37, (Ca) should read --Cd--.

Signed and Sealed this  
Fourth Day of December, 2018

Andrei Iancu  
*Director of the United States Patent and Trademark Office*